United States Patent [19]

Schutten et al.

[11] Patent Number: 4,936,143
[45] Date of Patent: Jun. 26, 1990

[54] CYLINDERS HAVING PISTON POSITION MEASUREMENT

[75] Inventors: Herman P. Schutten, Bayside, Wis.; Erlen B. Walton, Farmington Hills, Mich.; Robert W. Lade, Milwaukee, Wis.

[73] Assignee: Eaton Corporation, Cleveland, Ohio

[21] Appl. No.: 345,377

[22] Filed: Apr. 28, 1989

[51] Int. Cl.⁵ ............................................ G01M 19/00
[52] U.S. Cl. ........................................ 73/597; 92/5 R
[58] Field of Search .................... 73/597, 239, 119 A, 73/584, 596; 92/5 R

[56] References Cited

U.S. PATENT DOCUMENTS 4,452,074 6/1984 Shelometser et al. ............ 73/119 A

Primary Examiner—Jerry W. Myracle
Attorney, Agent, or Firm—C. H. Grace

[57] ABSTRACT

A cavity such as a chamber (10) of a hydraulic cylinder (2) containing a movable piston (4) is equipped with transducers (12) for transmitting alternating pressure signals into a fluid in the chamber and for receiving signals from it. The fluid chamber acts as a resonant tank circuit for determining the frequency of an external electronic oscillator (24). The frequency of oscillation of the circuit indicates the depth of the cavity, i.e., the position of the piston in the cylinder. Multiple modes of oscillation are employed (34, 36) in the same chamber to provide high accuracy and resolution of ambiguities. In one embodiment chambers (10', 66) on both sides of the piston (4') of a double-acting cylinder (2') are measured, and the readings are combined (76) to reduce errors that would otherwise result from changes in temperature, pressure, viscosity and other parameters unrelated to the position of the piston.

13 Claims, 5 Drawing Sheets

FIG. 6
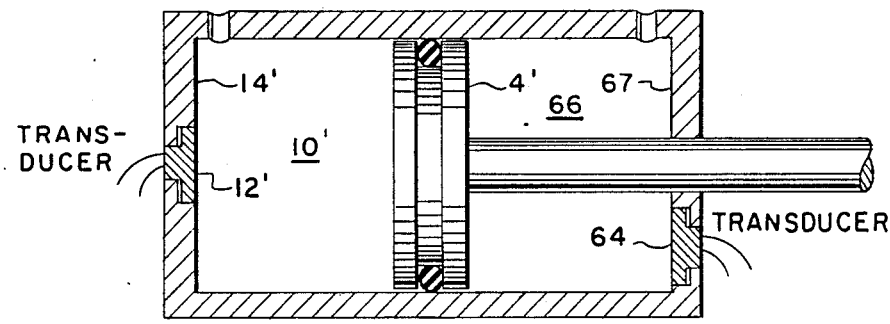
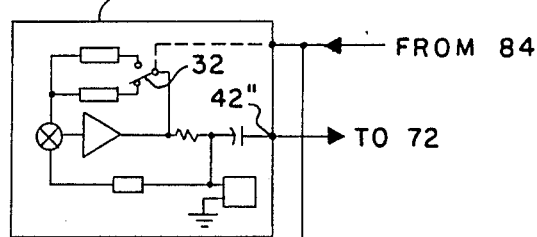
FIG. 7
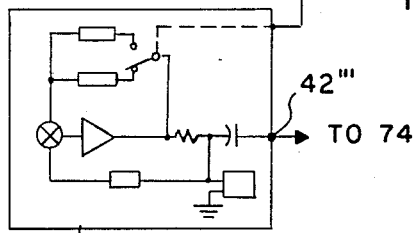
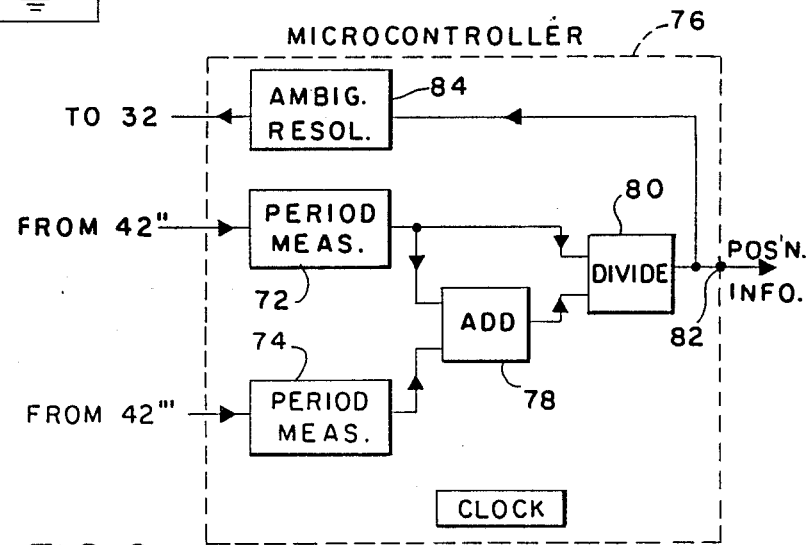
FIG. 8 ical depth of the cavity 10, and that resolves the ambiguities.

CYLINDERS HAVING PISTON POSITION MEASUREMENT

FIELD

The invention relates to sensing of the depth of a cavity such as of a hydraulic cylinder containing a movable piston. Examples are single-acting and double-acting cylinders for air and oil in which pressurized fluid powers the cylinder in one or both directions to extend or retract.

SUMMARY

Transducers are provided in a fluid chamber of a cylinder for transmitting pressure signals into the chamber and receiving pressure signals from it. The transducers are connected externally with amplifying means having positive feedback so that the fluid-filled chamber serves as a tank circuit for an oscillator. The frequency of oscillations is a measure of the depth of the chamber. One aspect of the invention is that a chamber supports multiples modes of oscillation and two or more modes are employed to perform the measurement of its depth. A low-frequency mode determines the approximate depth of the chamber. A high-frequency mode determines the depth more precisely, its ambiguities being resolved by the low-frequency mode.

Effects of changes in fluid temperature, pressure, viscosity, density, etc., are compensated by measuring in chambers on both sides of the piston. The measurements that are obtained of the two chambers are utilized in an algorithm to provide a compensated measurement of the position of the piston.

BRIEF DESCRIPTION OF FIGURES

FIG. 6 shows a cylinder having a depth measurement transducer in a chamber on one side of the piston and a similar arrangement on the other side of the piston.

FIG. 7 is a block diagram showing oscillators for use with the separate transducers of FIG. 6.

FIG. 8 is a conceptual diagram of functions of a microcontroller for use with FIGS. 6 and 7.

DETAILED DESCRIPTION OF PREFERRED EMBODIMENTS

I. Multiple Modes of Oscillation
One-Transducer Circuit

Figure 1:
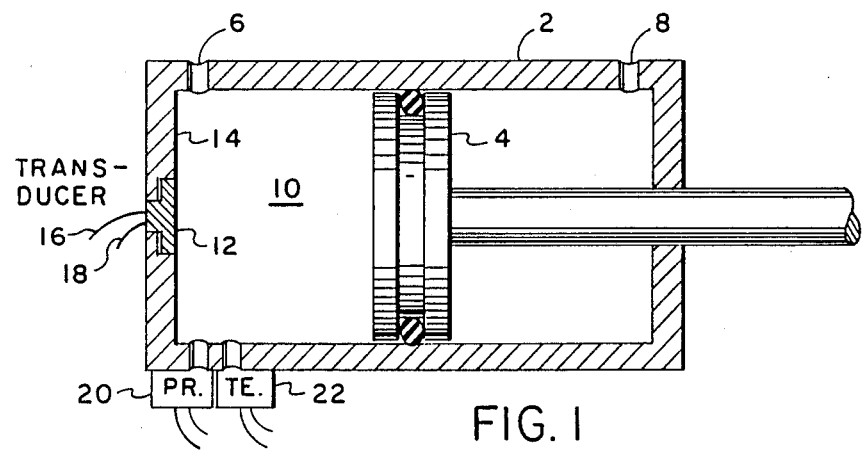
FIG. 1 shows a fluid chamber having one pressure transducer, for supporting multiple modes of oscillation.

FIG. 1 illustrates a specific example of an embodiment of the invention. A cylinder 2 encloses a piston 4 and has fluid ports 6 and 8 on the left and right sides of the piston as drawn. At least the lefthand chamber 10 is filled with a hydraulic fluid. A transducer 12 that converts electric voltage to mechanical motion and vice versa is mounted on the left face 14 of the enclosed cylinder, with its electrical leads 16, 18 available externally. The cylinder is also equipped with a pressure sensor 20 and a temperature sensor 22.

The transducer 12, upon being energized by an alternating current, produces waves in the fluid within chamber 10 that propagate to the right and reflect from a face of the piston 4. At certain frequencies of excitation, depending upon the position of the piston 4 within the cylinder 2, the actions of the transducer and multiple reflections result in standing waves in the fluid of chamber 10.

Several modes of standing wave oscillation are possible in the chamber 10 under resonant conditions. For example, a frequency of excitation in which a half wavelength in the fluid is equal to the spacing between the transducer and the piston 4 is one such resonant mode, and a frequency that results in two and one-half wavelengths between the transducer and the piston is another such mode.

Figure 2:
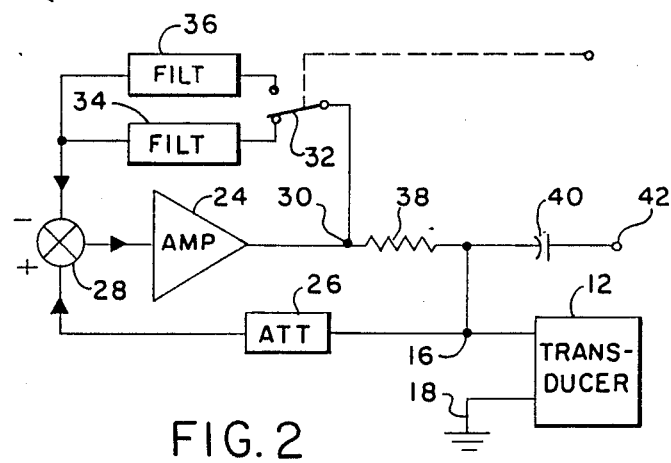
FIG. 2 is a sensing and amplifying circuit for the one-transducer arrangement of FIG. 1.

FIG. 2 shows the transducer 12 connected in an external circuit with an amplifier 24 that serves as an oscillator. One lead 18 of the transducer is connected to ground, and the other lead 16 is connected through an attenuator 26 to a positive-input terminal of an input adder 28 of the amplifier 24. The output terminal 30 of the amplifier is connected through a selector switch 32 to one or the other of two frequency filters 34, 36. Both of the frequency filters connect to an inverting input of the adder 28.

The output at terminal 30 also connects through a resistor 38 to the other lead 16 of transducer 12 and to a coupling capacitor 40, which provides an AC output signal from the oscillator circuit at a terminal 42.

During operation of the chamber of FIG. 1 and the circuit of FIG. 2, in the case of the example being described, a standing wave of one-half wavelength and another of two and one-half wavelengths are produced in the chamber 10 at slightly different times. When the static switch 32 connects the output of the amplifier 24 to the filter 34, the amplifier, the transducer 12, and the fluid in the cavity 10 oscillate. The frequency is determined by the depth of the cavity 10 and the passband characteristics of the filter 34, with a standing wave pattern of one-half wavelength in the cavity 10. The frequency is measured.

When the static switch 32 is connected to filter 36, the system oscillates at a frequency five times greater than previously, and produces two and one-half wavelengths of standing wave within the cavity 10. This shorter-wavelength mode of operation produces a precise measurement of the depth of the cavity 10, in the form of the frequency of output signal at terminal 42. The longer-wavelength operation resolves ambiguities in the shorter-wavelength measurement by indicating the approximate position of the piston 4, by means of a relatively low frequency at the terminal 42.

In an alternative form, the static switch 32 connects the output at 30 simultaneously to both filter 34 and filter 36; the circuit oscillates at two frequencies simultaneously.

Figure 3:
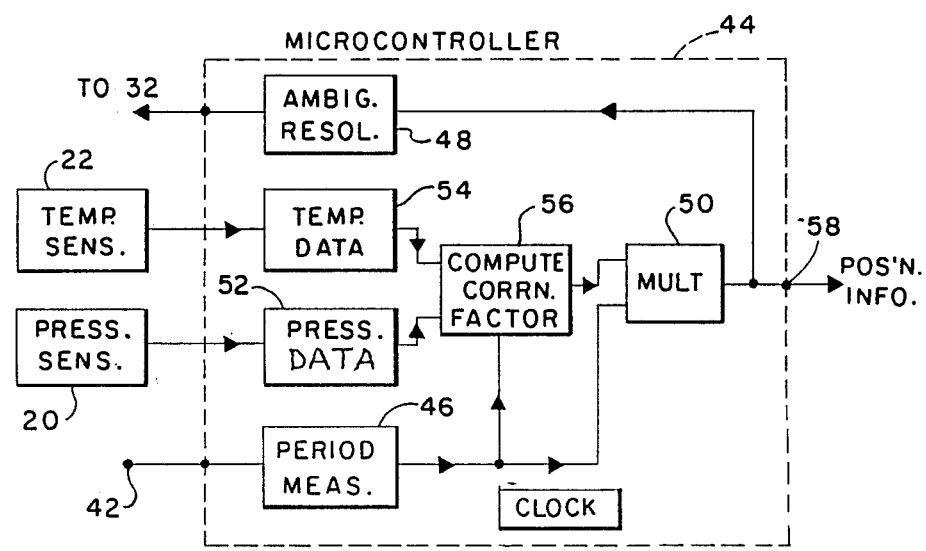
FIG. 3 is a conceptual diagram of functions of a microcontroller that is utilized with the circuit of FIG. 2.

FIG. 3 shows some of the functions of a microcontroller 44 that controls the static switch 32 and that receives the signals from the sensing apparatus. The microcontroller 44 receives the oscillation signals of terminal 42 in a period-measurement portion 46 of its software.

A time-sharing portion 48 of the microcontroller's software controls the selection of filter 34 or filter 36. Period-measurement data from the block 46 are multiplied in a multiplier 50 by a correction factor that compensates for changing temperature and pressure of the fluid in chamber 10. An electrical signal from the pressure sensor 20 is processed in a portion 52 of the software and temperature data from the temperature sensor 22 is processed in a temperature data portion 54 of the software of microcontroller 44. The processed data from blocks 52 and 54 are utilized in a software block 56 to compute a correction factor that is supplied to the multiplier 50. The correction factor computation depends upon the fluid employed; basically it computes the velocity of propagation in the fluid. Position information indicating the location of piston 4 in the cylinder 2 is provided at an output terminal 58.

Two-Transducer Circuit.

Figure 4:
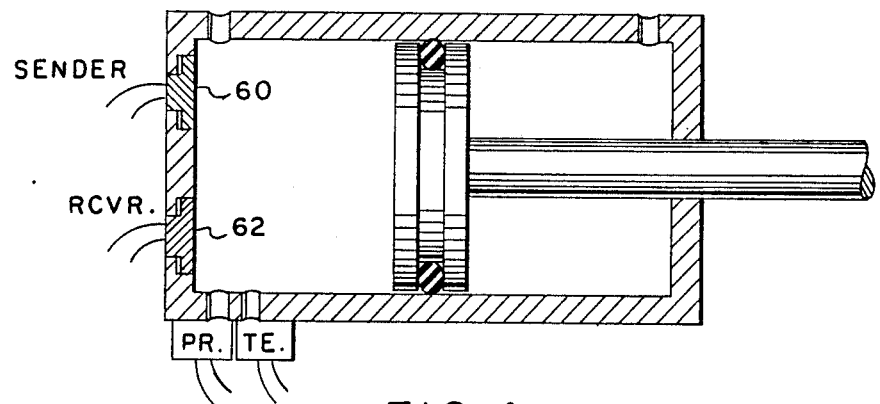
FIG. 4 is an embodiment in which a cylinder is equipped with separate sending and receiving transducers.

An alternative embodiment of the invention is shown in FIG. 4 where separate sending and receiving transducers are utilized within the cavity 10 to produce and detect waves in the fluid. The transducers can be any of several types including piezoelectric transducers and magnetostrictive transducers. The sender transducer 60 is shown on both FIG. 4 and FIG. 5. The receiver transducer 62 is also shown on both figures.

Figure 5:
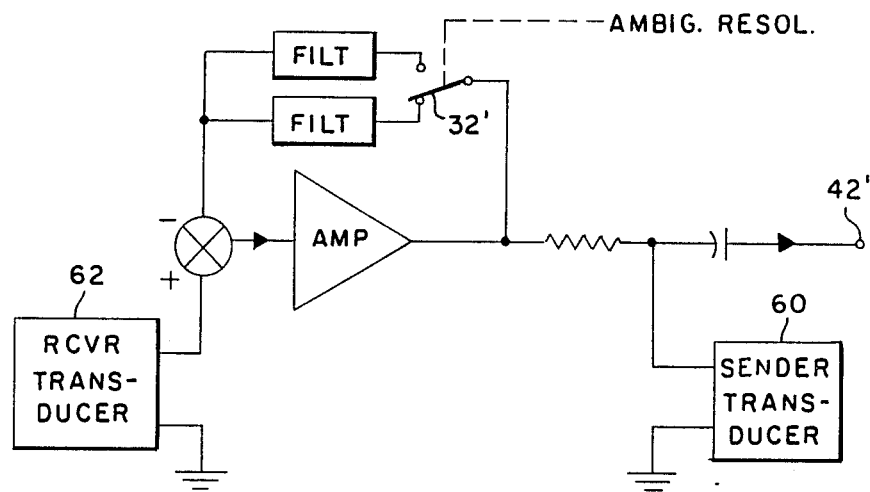
FIG. 5 is a circuit for use with the two-transducer device of FIG. 4.

The other components of FIG. 5, namely the amplifier, input adder, two filters, static selector switch, resistor, and coupling capacitor are the same as the corresponding components of FIG. 2 and operate in the same way. An output terminal 42' of FIG. 5 takes the place of the output terminal 42 of FIG. 2 and is connected to the period measurement software symbol 46 of the microcontroller 44 as shown in FIG. 3. Operation of the circuit of FIGS. 4 and 5 is so similar to that of FIGS. 1, 2 and 3 as not to require repetition of the description.

II. Measurements on Both Sides of Piston

Simultaneous Measurements by One-Transducer Circuits.

In FIG. 6, a transducer 12' is in chamber 10' of a cylinder 2' at the left of the piston 4', having left end 14'. Another transducer 64 is in a chamber 66 at the right of the piston 4', having right end 67. The purpose of transducer 64 is to compensate for the effects of changes in fluid temperature, pressure, viscosity, density, etc. by measuring the chamber depth on both sides of the piston. It is known that the sum of the depths of the cavities 10' and 66 is known (a constant if the volume of the piston rod is ignored). Consequently, data as to cavity depth of 10' and 66 can be processed in any of several ways to eliminate or at least greatly reduce the undesired effects of parameters that affect the velocity of propagation of sonic waves in the fluid and therefore affect the data of either transducer when taken alone.

FIG. 7 has a block 68 that represents a circuit identical to that of FIG. 2 except that transducer 12 is replaced by transducer 12'. FIG. 7 also has a block 70 that represents another circuit identical to that of FIG. 2, except that the transducer 12' is replaced by transducer 64. If desired, one of the filters 34 or 36 and the filter selector switch 32 can be omitted if they are believed to be unnecessary.

Signals from blocks 68 and 70 are conducted via terminals 42" and 42''' respectively to period-measurement software portions 72, 74, respectively of microcontroller 76, FIG. 8. The particular algorithm selected in this example for processing data from the left and right cavities 10', 66 is a ratio computation. Other algorithms could be used. The period of a standing wave that resonates in chamber 10', as measured by block 72, is added to the period of a standing wave in chamber 66, as measured by block 74. The addition is accomplished in a block 78 of the microcontroller. Thereafter, the period measured by block 72 is divided in a divider 80 by the sum produced by the adder 78. The resulting quotient, which is output at a terminal 82, is a measure of the position of the piston 4' within the cylinder of FIG. 6. An ambiguity-resolution portion 84 of the software of microcontroller 76 controls the static switching between the filters of FIG. 2, if this feature is desired.

Time-Shared Measurements by One-Transducer Circuits.

Figure 9:
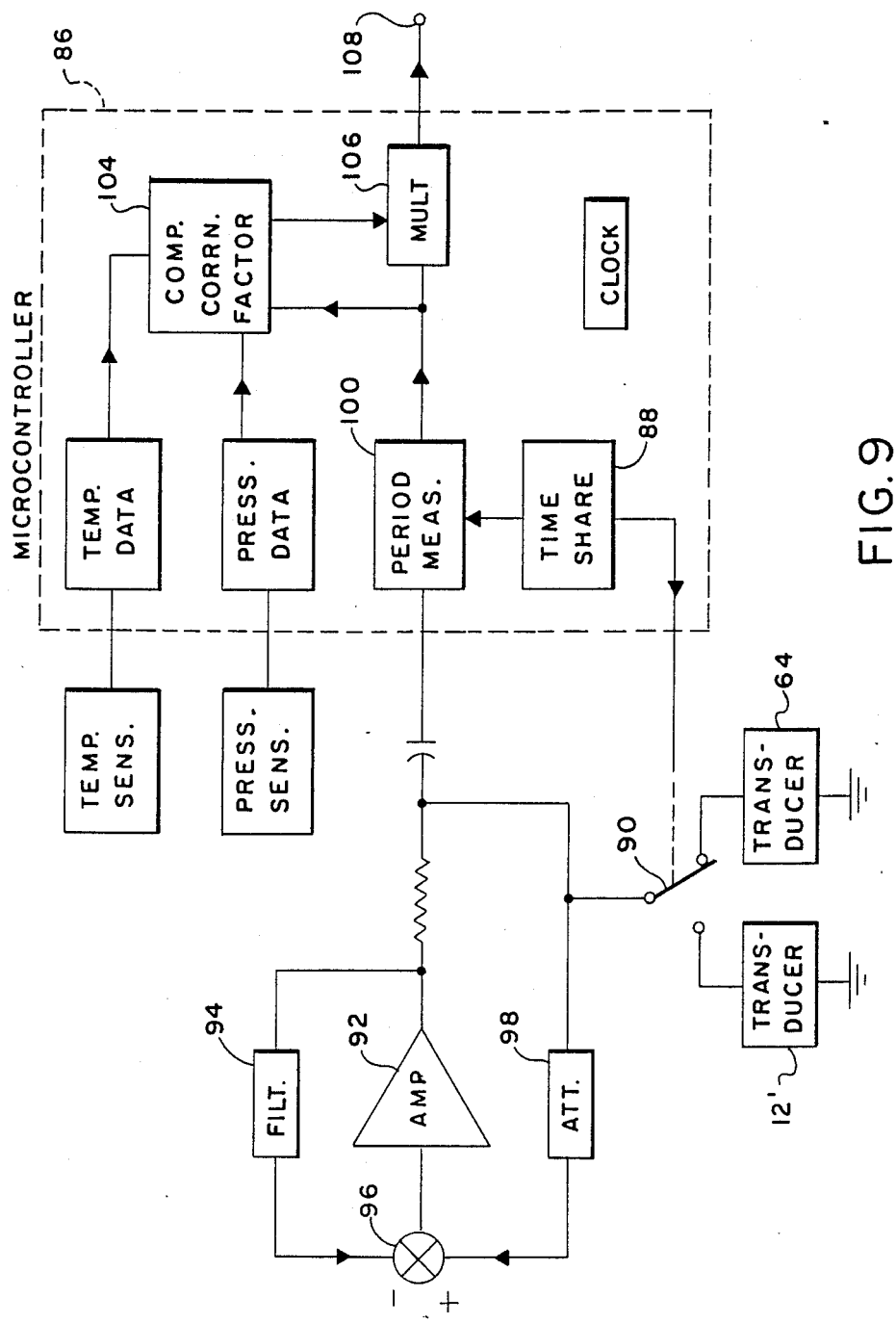
FIG. 9 is an alternative electronic system for use with the two-chamber cylinder of FIG. 6 and in which one oscillator circuit is used in common by the two transducers.

The arrangement of FIG. 6 in which only one transducer is provided for each cavity 10', 66 of the cylinder can be used with the circuit of FIG. 9 instead of that of FIGS. 7 and 8. In this alternative embodiment a microcontroller 86 has a time-sharing portion 88 of software which controls a static switch 90 as shown in FIG. 9. The transducers 12' and 64 of FIG. 6 are alternately connected to a circuit 92 etc. similar to that of FIG. 2. The use of an oscillator circuit in common increases the accuracy by cancellation of common-mode errors.

An amplifier 92 oscillates at a frequency within a range that is controlled by a filter 94. Filter 94 is connected in a negative feedback path to an input adder 96 of the amplifier circuit. An attenuator 98 connects from an output point to a positive input terminal of the input adder 96. Either the transducer 12' or the transducer 64 is connected near the output of amplifier 92 to serve as a resonant tank circuit for determining the frequencies of oscillation of the acoustic cavities 10', 66. A period-measurement portion 100 of the microcontroller 86 performs the function of period measurement of the two cavities and addition and division of the results, in the manner described in connection with FIG. 8.

In the embodiment of FIG. 9, temperature and pressure sensors are also utilized to compute a correction factor in a portion 104 of software, which controls a multiplier 106 to provide even more accurate output data at a terminal 108.

Two-Transducer Circuits.

Figure 10:
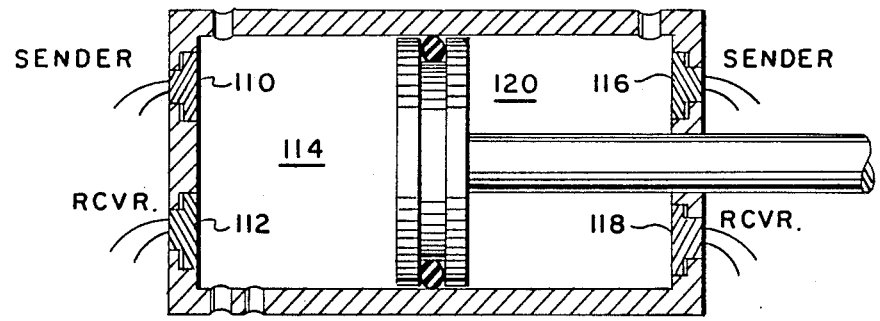
FIG. 10 is a cylinder equipped with separate sending and receiving transducers in the cavity on one side of its piston and with separate sending and receiving transducers in the cavity on the other side of its piston.

In FIG. 10 a cylinder is equipped with a sending transducer 110 and a receiving transducer 112 in a left-hand cavity 114. It also has a sending transducer 116 and a receiving transducer 118 in a right-hand cavity 120.

Figure 11:
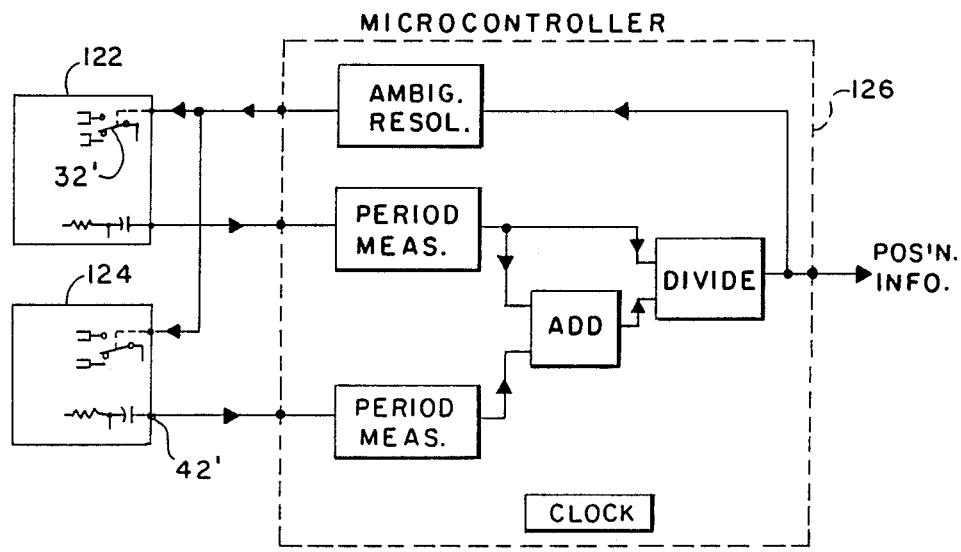
FIG. 11 is a simplified block diagram of electronic equipment for use with FIG. 10.

Signals from the transducers 110 and 112 are utilized in a circuit identical to that of FIG. 5, as indicated in FIG. 11 by the block 122. Similarly, signals of the transducers 116 and 118 are utilized in a circuit identical to that of FIG. 5, which is represented in FIG. 11 by a block 124. A microcontroller 126 of FIG. 11 receives the ac signals from blocks 122 and 124. The circuits of block 126 are identical to those of microcontroller 86 of FIG. 9. The operation of the apparatus of FIGS. 10 and 11 is almost identical with that of FIGS. 6, 7 and 8, and hence will not be repeated here.

III. Scope of the Invention

Although many embodiments have been described, they do not purport to be all possible embodiments of the invention, whose scope is determined by the claims. The frequencies of excitation of the chambers can be sonic, or above or below the sonic range.

We claim:

1. Fluid power apparatus comprising:
   a cylinder (2) having a first end surface (14);
   a piston (4) adapted for axial movement in said cylinder and defining a first main fluid chamber (10) bounded by the piston and said first end surface;
   first transducer (12) means for coupling vibrations with fluid in said first main chamber for producing resonant oscillations therein;
   first amplifier means (24) having positive feedback and connected with said first transducer means for interacting with the fluid in said first main chamber to oscillate and provide oscillation signals;
   said first amplifier means comprising first mode-determining means (34) for supporting oscillations in a first mode of oscillation;
   said first amplifier means further comprising second mode-determining means (36) for supporting oscillations in a second mode of oscillation;
   whereby said chamber can support oscillations in at least said two modes, whose wavelengths and frequencies are functions of the position of the piston in the cylinder;
   information-processing means (44) receiving oscillation signals of said first and second modes for providing an output signal (58) dependent upon the frequencies of said signals and indicative of the position of the piston in the cylinder.

2. Fluid power apparatus as in claim 1 and wherein said first transducer means comprises a single transducer means (12) for both transmitting vibrations into said fluid and receiving vibrations from said fluid.

3. Fluid power apparatus as in claim 1 and wherein said first transducer means comprises separate sending-transducer means (60) for transmitting vibrations into said fluid and receiving-transducer means (62) for receiving vibrations from said fluid.

4. Fluid power apparatus as in claim 1 and further comprising means (48, 32) for switching said first amplifier means from said first mode-determining means to said second mode-determining means;
   said second mode being at a higher frequency and shorter wavelength of oscillation than said second mode;
   whereby said second mode can provide accurate position measurements and said first mode can prevent ambiguities of position measurement of the piston.

5. Fluid power apparatus as in claim 1 and wherein said first amplifier means comprises means (48, 32) for simultaneously operating said first and second mode-determining means, thereby to support oscillations simultaneously in both said first and second modes.

6. Fluid power apparatus as in claim 5 and wherein said first amplifier means comprises a separate amplifier (68, 70) for each of said first and second modes.

7. Fluid power apparatus as in claim 1 and wherein said first amplifier means comprises switching means (48,32) for operating said first and second mode-determining means at different times;
   thereby to support oscillations at different times in said first and second modes.

8. Fluid power apparatus comprising:
   a cylinder (2') having first and second end surfaces (14', 67);
   a piston (4') adapted for axial movement in said cylinder and defining a first main fluid chamber (10') bounded by the piston and said first end surface; and defining a second main fluid chamber (66) bounded by the piston and said second end surface;
   first transducer means (12') for coupling vibrations with fluid in said first main chamber for producing resonant oscillations therein;
   second transducer means (64) for coupling vibrations with fluid in said second main chamber for producing resonant oscillations therein;
   amplifier means (68, 70) having positive feedback and connected with said first and second transducer means for interacting with the fluid in said first and second main chambers to provide oscillation signals whose wavelengths are functions of the position of the piston in the cylinder;
   information-Processing means (76) receiving oscillation signals of both said first and second chambers for providing an output signal (82) dependent upon the frequencies of said signals and indicative of the position of the piston in the cylinder.

9. Fluid power apparatus as in claim 8 and wherein at least one of said first transducer means and said second transducer means comprises a single transducer means (12')for both transmitting vibrations into said fluid of its respective chamber and receiving vibrations from said fluid of its respective chamber.

10. Fluid power apparatus as in claim 8 and wherein at least one of said first transducer means and said second transducer means comprises separate sending-transducer means (110, 116) for transmitting vibrations into said fluid of its respective chamber and receiving-transducer means (112, 118) for receiving vibrations from said fluid of its respective chamber.

11. Fluid power apparatus as in claim 8 and wherein said amplifier means comprises:
    first amplifier means (122) having positive feedback and connected with said first transducer means for interacting with the fluid in said first main chamber to provide oscillation signals whose wavelengths are functions of a dimension of the first main chamber; and
    second amplifier means (124) having positive feedback and connected with said second transducer means for interacting with the fluid in said second main chamber to provide oscillation signals whose wavelengths are functions of a dimension of the second main chamber.

12. Fluid power apparatus as in claim 8 and wherein said amplifier means comprises:
    switchable amplifier means (122) switchable for connection with said first transducer means for interacting with the fluid in said first main chamber to provide oscillation signals whose wavelengths are functions of a dimension of the first main chamber and switchable for connection with said second main chamber to provide oscillation signals whose wavelengths are functions of a dimension of the second main chamber.

13. Fluid power apparatus as in claim 8 and wherein two simultaneous modes of said resonant oscillations are produced, one in said first main chamber and the other in said second main chamber.

* * * * *